United States Patent Office 3,208,711
Patented Sept. 28, 1965

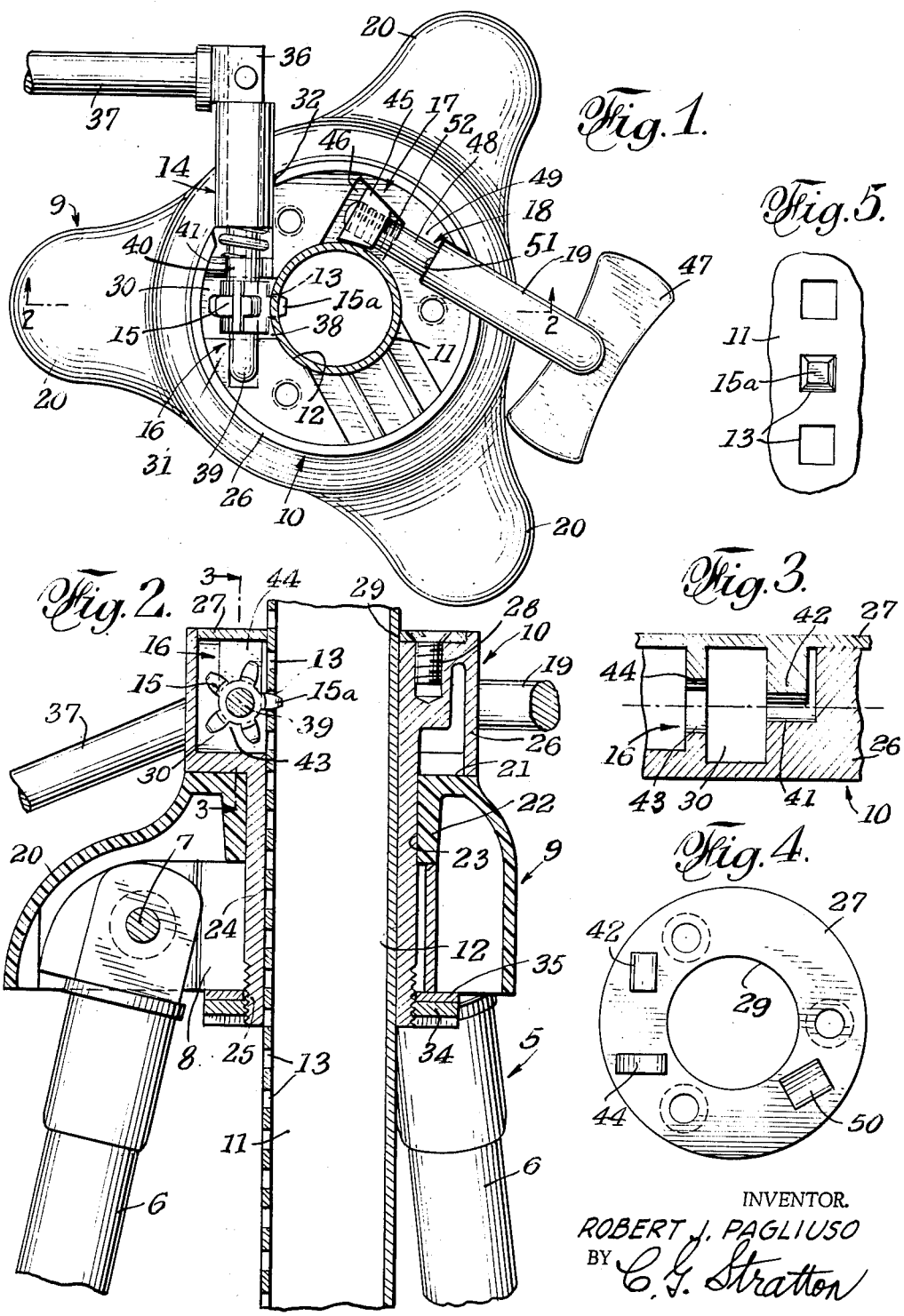

3,208,711
EXTENSION MEANS FOR TRIPODS
Robert J. Pagliuso, La Canada, Calif., assignor to Hollywood Products Corporation, Chicago, Ill., a corporation of Illinois
Filed June 3, 1963, Ser. No. 285,099
2 Claims. (Cl. 248—422)

This invention relates to extension means for tripods that may have general utility and are more particularly useful for camera-mounting tripods.

An object of the invention is to provide extension or elevator means for tripods that provides for accuracy of operation and yet is simply assembled, with easy facility, of parts having bearings that are cast portions of the parts and, therefore, economical to manufacture.

Another object of the invention is to provide tripod extension means, as characterized above, that embodies a simplified rack and pinion interconnection of the tripod head and the extension member of the device.

A further object of the invention is to provide means of the character referred to that enables smooth operating extension movement.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a top plan view of the present extension means with the extension member in cross-section and a bearing and closure plate removed to expose details of the construction.

FIG. 2 is a vertical sectional view as taken on the line 2—2 of FIG. 1.

FIG. 3 is a view as taken on the line 3—3 of FIG. 2 with portions omitted.

FIG. 4 is a bottom plan view of the bearing and closure plate mentioned in connection with the description of FIG. 1.

FIG. 5 is an enlarged and fragmentary view of combined extension drive and stabilizing means interconnecting the head and extension member.

The present extension means is shown in connection with a tripod 5 that is represented by the legs 6 and which are connected by pivots 7 to a triangular connector frame 8.

The extension means that is illustrated comprises, generally, a preferably non-metallic body part 9 in which the tripod frame 8 is housed and from which the tripod legs 6 extend downwardly, a metal insert body part 10 fixedly connected to the body part 9, an extension tube 11 slidably engaged in a vertical bore 12 in the body part 9 and provided with longitudinally arranged holes 13 that have a gear-rack function, an operating shaft 14 mounted in the body part 10 and provided with a pinion gear 15 that is in engagement with the holes 13 in tube 11 to raise and lower said tube in the bore 12, according to the direction that said shaft 14 is turned, bearing means 16 for said shaft, wedge means 17 mounted in said body part 10 for imposing movement-resisting or locking friction, as desired, on the tube 11, and bearing means 18 for the operating shaft 19 of said wedge means.

The body part 9 is advantageously molded of high-impact plastic and is formed to have three uniformly spaced extensions 20 that are hollow to house connector frame 8 of the tripod 5. Said body part is formed with an upper transversely flat face 21 and with a relatively short central hub 22 that extends downwardly from said face and has a cylindrical bore 23.

The insert body part 10 is molded or cast of metal with a cylindrically tubular portion 24 that is fitted into the bore 23 of the body part 9 and has an externally threaded end 25 that extends below the lower edge of the body part 9. Said portion 24 has the previously mentioned bore 12 into which the tube 11 is slidingly fitted. Said body part is provided with an upper cylindrical and enlarged housing portion 26 that rests upon the surface 20. Said housing portion is covered at its top by a plate 27 which is held in place on the housing portion 26 by screws 28 and has a central hole 29 of the size of the bore 12 for the tube 11.

A tangential hollow 30 in the top of the housing portion 26 is open at the top, blind at one end 31 and extends through the cylindrical outer face of said portion at its other end 32.

The two body portions 9 and 10 are connected by means (not shown) to be relatively non-rotational. A nut 34 engaged with the threaded end 25 of the body portion 10, and a washer 35 lock the portions 9 and 10 together with the tripod frame 8 locked in between the lower end of the hub 22 and the washer 35.

The tube 11 is preferably formed of inexpensive, seamless aluminum tubing, such as used in the manufacture of tubular furniture, and the holes therein are preferably square in shape and spaced according to the pitch of the pinion gear 15 so that the teeth of said gear may successively enter said holes to provide a rack and pinion interengagement of the pinion gear with the tube 11.

The operating shaft 14 resides in the hollow 30 and has an end 36 that extends from the end 32 of said hollow and is provided with a preferably fold-away crank 37 by means of which the shaft may be turned. The pinion gear 15 is so affixed to the shaft 14 as to be aligned with the holes 13, as may be seen in FIG. 1. The hollow 30 is open to the bore 12 at 38, the teeth of the pinion gear 15 extending beyond said opening so they may enter the holes 13. In this case, the shaft 14 has a reduced end 39 on one side of gear 15, and a somewhat larger portion 40 on the opposite side of said gear.

The bearing means 16 is shown as complementary bearing parts 41 and 42, that journal the end 39 of the shaft, and complementary parts 43 and 44, that journal the shaft portion 40. As can best be seen in FIG. 3, the bearing parts 41 and 43 are integrally formed in the housing portion 26 and the bearing parts 42 and 44 are formed as integral extensions depending from the under surface of the closure plate 27. FIG. 2 shows how the complementary bearing parts 43 and 44 form a circular bearing for the shaft portion 40. The parts 41 and 42 form a similar but smaller circular bearing for the reduced end 39 of the shaft.

The wedge means 17 is shown as a wedge element 45 of regular trapezoidal form and loosely residing in a cavity 46 that is open to the bore 12, the shaft 19 being threadedly connected to said element and extending beyond the perimeter of the housing portion 26 of the body part 10. A turn handle 47 is provided on the end of said shaft 19.

The bearing means 18 is similar to the bearing means 16 in that the shaft portion 48 of the shaft 19 is journalled in a split bearing comprising a part 49 in the housing portion 26 similar to the part 41 and a complementary part 50 similar to the part 42 depending from the closure plate 27.

A shoulder 51 in shaft 19 has endwise abutment with the bearing means 18 to retain the shaft against endwise movement during rotational manipulation thereof so its threaded end 52 will draw the wedge element 45 into frictional engagement with the extension tube 11.

The wedge means 17 may be used for locking the tube 11 tightly or with just enough friction to hold the vertical adjustment by the gear and rack means, without further adjustment of the wedge lock.

The teeth 15a of the pinion gear 15 are not only tapered according to common gear tooth design, said teeth are also tapered from the opposite side faces thereof. Thus, as can be seen best from FIG. 5, the ends of the teeth readily enter the square holes 13 of the tube 11. The size of said holes conforms to the square cross-sectional size of the teeth. Therefore, the latter effect a keying engagement with the tube 11 that so stabilizes the head on the tube that looseness or play therebetween is eliminated and the camera or other device carried by said tube is in fixed position, as adjusted. Although the fit of the pinion teeth in the holes is snug, yet the mentioned adjustment, up or down, of the tube is effectively carried out.

The gear means 15 and the wedge means 17 have respective operating shafts 39 and 19 that are arranged in 120° phased relation.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. An extension means for a tripod comprising:
   (a) a body connected to the top of a tripod and having a vertical bore therein and a cavity spaced laterally from said bore,
   (b) a tube slidably extending through said bore and provided with longitudinally and uniformly spaced holes in the wall thereof,
   (c) gear means carried by the body and having tapered teeth, which at their bases snugly fit into the holes in the tube to effect movement of the tube and body relatively, said snugly fitted teeth holding said tube and body against relative rotation, and
   (d) adjustable wedge means loosely mounted in said body cavity formed with a tapered face engaging the peripheral surface of said tube at a tangent thereto, said means having a threaded bore therethrough, and a shaft having a threaded extremity engaging the threads in said bore, said shaft projecting outwardly through said body for manual rotation to move said means against said tube to frictionally resist the relative movement of the tube and body during operation of said gear means and to retain said tube and body in adjusted position, and means engaging said shaft for preventing its longitudinal movement during rotation.

2. An extension means for a tripod comprising:
   (a) a body connected to the top of a tripod and having a vertical bore therein and a cavity spaced laterally from said bore,
   (b) a tube slidably extending through said bore and provided with longitudinally and uniformly spaced holes in the wall thereof,
   (c) gear means carried by the body and having tapered teeth which, at their bases snugly fit into the holes in the tube to effect movement of the tube and body relatively, said snugly fitted teeth holding said tube and body against relative rotation,
   (d) adjustable wedge means loosely mounted in said cavity formed with a tapered face engaging the peripheral surface of said tube at a tangent thereto, said means having a threaded bore therethrough, and an operating shaft having a threaded extremity engaging the threads in said bore, said shaft projecting outwardly through said body for manual rotation to move said means against said tube to frictionally resist the relative movement of the tube and body during operation of said gear means and to retain said tube and body in adjusted position, and means engaging said shaft for preventing its longitudinal movement during rotation,
   (e) said body having an open top end and provided with a closure plate with a hole in register with the body bore,
   (f) the gear means having an operating shaft and said shaft being arranged in 120° phased relation with the operating shaft of said wedge means,
   (g) the body having upwardly-facing bearing parts integrally formed therein and journalling the shafts therein, and
   (h) the closure plate having integral and complementary bearing parts that retain the shafts in journalled position.

References Cited by the Examiner
UNITED STATES PATENTS

| | | | |
|---|---|---|---|
| 180,806 | 8/76 | Striegel | 248—404 |
| 218,298 | 8/79 | McCook et al. | 248—404 |
| 466,923 | 1/92 | Price | 74—437 |
| 619,047 | 2/99 | Mayer | 74—462 |
| 1,141,544 | 6/15 | Helander et al. | 308—74 |
| 1,270,350 | 6/18 | Watkins | 248—406 |
| 1,347,243 | 7/20 | Beardsley | 74—91 |
| 1,392,144 | 9/21 | Gray | 248—404 |
| 1,442,075 | 1/23 | Knechtel | 248—244 |
| 1,484,371 | 2/24 | Brown | 248—406 |
| 1,573,496 | 2/26 | Jansson et al. | 248—404 |
| 1,574,894 | 3/26 | Jansson | 284—404 |
| 1,613,702 | 1/27 | Hammar | 74—462 |
| 2,391,536 | 12/45 | Anderson et al. | 248—404 |
| 2,453,656 | 11/48 | Bullard | 74—422 |
| 2,508,122 | 5/50 | Mooney | 248—404 |
| 2,670,634 | 3/54 | Pagliuso | 248—404 |
| 2,869,389 | 1/59 | Proefke | 74—462 |
| 3,098,681 | 7/63 | Kohlhagen et al. | 74—606 |

CLAUDE A. LE ROY, *Primary Examiner.*